(12) United States Patent
Jung et al.

(10) Patent No.: US 8,832,786 B2
(45) Date of Patent: Sep. 9, 2014

(54) INFORMATION STORAGE MEDIUM STORING MANAGEMENT INFORMATION OF APPLICATION EXECUTABLE FROM A PLURALITY OF STORAGE MEDIA, AND METHOD AND APPARATUS FOR EXECUTING THE APPLICATION

(75) Inventors: Kil-soo Jung, Hwaseong-si (KR); Sung-wook Park, Seoul (KR); Kwang-min Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 12/191,366

(22) Filed: Aug. 14, 2008

(65) Prior Publication Data
US 2008/0298783 A1 Dec. 4, 2008

Related U.S. Application Data

(63) Continuation of application No. 11/330,129, filed on Jan. 12, 2006.

(30) Foreign Application Priority Data

Jan. 12, 2005 (KR) .................................. 2005-3008
Jun. 21, 2005 (KR) ................................ 2005-53609

(51) Int. Cl.
*G06F 17/30* (2006.01)
*G11B 19/12* (2006.01)
*G11B 27/00* (2006.01)
*G11B 27/32* (2006.01)
*G11B 20/00* (2006.01)
*G11B 20/10* (2006.01)
*G11B 20/12* (2006.01)

(52) U.S. Cl.
CPC ...... *G11B 19/122* (2013.01); *G11B 2020/1288* (2013.01); *G11B 27/002* (2013.01); *G11B 27/322* (2013.01); *G11B 2220/40* (2013.01); *G11B 2220/2541* (2013.01); *G11B 20/00115* (2013.01); *G11B 20/10* (2013.01)
USPC .......................................................... 726/2

(58) Field of Classification Search
CPC ..................... G11B 2220/2541; G11B 27/105; G11B 2220/40
USPC ........................................ 707/802–807; 726/2
See application file for complete search history.

(56) References Cited

U.S. PATENT DOCUMENTS

| 4,463,380 A | 7/1984 | Hooks, Jr. |
| 5,642,417 A | 6/1997 | Stringer |

(Continued)

FOREIGN PATENT DOCUMENTS

| CN | 1695197 | 11/2005 |
| JP | 7-14313 | 1/1995 |

(Continued)

OTHER PUBLICATIONS

Screen Shots of Super Mario All Stars for the SNES, copyright 2002 by Nintendo.*

(Continued)

*Primary Examiner* — Mahesh Dwivedi
(74) *Attorney, Agent, or Firm* — NSIP Law

(57) ABSTRACT

An information storage medium storing management information of an application executable from a plurality of information storage media, and a method and apparatus for executing the application based on the management information are provided. The method includes: if a new information storage medium is inserted into a reproducing apparatus during the execution of the application, reading information on an identifier of the new information storage medium; and determining whether to continuously execute the application based on the information and continuously executing the application according to a result obtained by the determination. The information on the identifier of the new information storage medium may be included in the application or in an application management table (AMT) of the information storage medium. A life cycle of a disc unbound application is managed so as to use an application that can be shared by different information storage media.

7 Claims, 7 Drawing Sheets

(56) References Cited

U.S. PATENT DOCUMENTS

| | | | |
|---|---|---|---|
| 5,687,160 A * | 11/1997 | Aotake et al. | 369/275.3 |
| 5,718,632 A | 2/1998 | Hayashi | |
| 6,141,730 A | 10/2000 | Nishiumi et al. | |
| 6,185,574 B1 | 2/2001 | Howard et al. | |
| 6,215,746 B1 | 4/2001 | Ando et al. | |
| 6,230,232 B1 * | 5/2001 | Nishiumi et al. | 711/4 |
| 6,448,972 B1 * | 9/2002 | Takamiya | 345/531 |
| 6,529,992 B1 | 3/2003 | Thomas et al. | |
| 6,820,265 B1 * | 11/2004 | Stamper et al. | 719/312 |
| 7,307,935 B2 | 12/2007 | Kusano et al. | |
| 7,764,868 B2 | 7/2010 | Okada et al. | |
| 2001/0010067 A1 * | 7/2001 | Nishiumi et al. | 711/112 |
| 2002/0128067 A1 * | 9/2002 | Blanco | 463/43 |
| 2007/0220430 A1 | 9/2007 | Sato | |

FOREIGN PATENT DOCUMENTS

| | | |
|---|---|---|
| JP | 10-327381 | 12/1998 |
| JP | 2002-343062 | 11/2002 |
| KR | 2003-60648 | 7/2003 |
| TW | 416861 B | 1/2001 |
| TW | 452782 | 9/2001 |
| TW | 200305873 A | 11/2003 |
| TW | 452782 | 8/2004 |
| TW | I220187 | 8/2004 |
| WO | WO 2004/025651 | 3/2004 |
| WO | WO 2004/084212 | 9/2004 |

OTHER PUBLICATIONS

Instruction Manual for Metal Gear Solid issued to Konami with copyright 2000.*
Article entitled "Grand Theft Auto: Mission Pack #1: London 1969 Review" by Gertsmann, dated May 28, 1999.*
Manual for the Commercial Product Nintendo DS, commercially available for sale in the United States on Nov. 31, 2004.*
Article entitled "Official Nintdeno DS Launch Details" by Harris, dated Sep. 20, 2004.*
R. Person et al., *Using Windows 3.1*, Special Edition, pp. 1098-1099, Dec. 1992, Que Corporation, Carmel, IN.
Search Report and Written Opinion issued in International Patent Application No. KR 2006/000122 on Mar. 30, 2006.
Office Action issued on Sep. 19, 2006 by the Korean Intellectual Property Office for Korea Patent Application 2005-53609.
U.S. Appl. No. 11/330,129, filed Jan. 12, 2006, Kil-soo Jung, et al., Samsung Electronics Co., Ltd.
Office Action issued Aug. 6, 2009, in the Taiwanese Patent Office in corresponding Taiwanese Patent Application No. 95101026.
"Red Hat Linux 8 Player Collection," *Red Hat Linux 8*, Nov. 2002, pp. 1-3.
Taiwanese Office Action issued on Jan. 19, 2011, in corresponding Taiwanese Patent Application No. 97130703 (5 pages).
Kyodai Software Marketing: "Ancient Land of Ys" User Manual, Jan. 1, 1989, URL: http://www.replacementdocs.com/request.php?295.
VBird, Know-how for Installation of FC4 and Multiple Boot-up, Nov. 8, 2005, Special Tips on Linux from Brother Bird, URL: http://linux.vbird.org/linux_basic/0156installfc6.php.
European Search Report issued on Jul. 27, 2010, in corresponding European Application No. 06700080.2 (5 pages).
Taiwanese Office Action issued on Sep. 7, 2010, in corresponding Taiwanese Patent Application No. 97130703 (5 pages).
Taiwanese Office Action issued Oct. 19, 2011, in counterpart Taiwanese application No. 095101026 (14pp, including English translation).
Taiwanese Preliminary Notice of First Office Action issued on March 27, 2008, in counterpart Taiwanese Application No. 095101026 (33pp. including English translation).
Ming-Chou, Chen, "Single chip—Application of Timer Module Timer 0", Oct. 28, 2002, Yuan Ze University, Taiwan.
Chinese Office Action issued on May 25, 2011 in corresponding Chinese Patent Application No. 210110224625.8 (15 Pages—With Translation).
Taiwanese Office Action issued on Jun. 16, 2011 in corresponding Taiwanese Patent Application No. 097130703 (9 Pages—With Translation).
Taiwanese Office Action issued Jun. 11, 2012, in counterpart Taiwanese application No. 095101026 (11pp, including English translation).
Preliminary Notice of Final Office Action issued on Dec. 5, 2012 of the R.O.C. Application No. 9510126, which corresponds to U.S. Appl. No. 12/191,366, with full English translation. 18 Pages.
Chinese Office Action issued on Sep. 7, 2012 in counterpart Chinese Patent Application No. 201010224624.3 (10 pages, including English language translation).
Chinese Office Action issued on Sep. 28, 2012 in counterpart Chinese Patent Application No. 200910179532.5 (12 pages, including English language translation).
Final Office Action issued May 13, 2013 in counterpart Taiwanese Patent Application No. 095101026. (9 pages including English Translation).

* cited by examiner

TITLE #1 AMT

| APPLICATION IDENTIFIERS | WHETHER APPLICATION IS DISC UNBOUND APPLICATION | DISC UNBOUND INFORMATION |
|---|---|---|
| APPLICATION #1 | YES | DISC_ID #2, DISC_ID #3 |
| APPLICATION #2 | NO | - |
| APPLICATION #3 | NO | - |

FIG. 6B

TITLE #1 AMT

| APPLICATION TYPES | APPLICATION IDENTIFIERS | UNBOUND INFORMATION |
|---|---|---|
| TITLE BOUND | APPLICATION #1 | – |
|  | APPLICATION #2 | – |
|  | APPLICATION #3 | – |
| TITLE UNBOUND | APPLICATION #4 | TITLE #1, TITLE #2 |
| DISC UNBOUND | APPLICATION #5 | DISC_ID #2, DISC_ID #3 |
|  | APPLICATION #6 | DISC_ID #1, DISC_ID #3 |

FIG. 6C

TITLE #1 AMT

| APPLICATION IDENTIFIERS | WHETHER APPLICATION IS DISC UNBOUND APPLICATION |
|---|---|
| APPLICATION #1 | YES |
| APPLICATION #2 | NO |
| APPLICATION #3 | NO |

FIG. 7

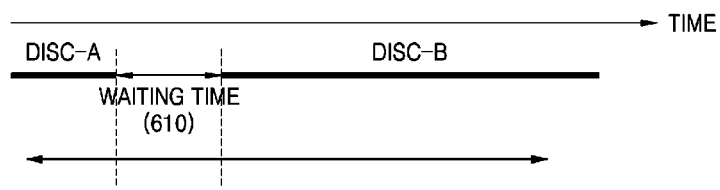

INFORMATION STORAGE MEDIUM STORING MANAGEMENT INFORMATION OF APPLICATION EXECUTABLE FROM A PLURALITY OF STORAGE MEDIA, AND METHOD AND APPARATUS FOR EXECUTING THE APPLICATION

CROSS-REFERENCE TO RELATED APPLICATIONS

This application is a continuation of application Ser. No. 11/330,129, filed Jan. 12, 2006, which claims the benefit of Korean Application Nos. 2005-3008 and 2005-53609, filed Jan. 12, 2005 and Jun. 21, 2005, respectively, in the Korean Intellectual Property Office, the disclosures of which are incorporated herein by reference.

BACKGROUND OF THE INVENTION

1. Field of the Invention

The following description relates to reproduction of multimedia data recorded on an information storage medium, and, more particularly, to an information storage medium storing management information of an executable application from a plurality of information storage media, and a method and apparatus to execute the application based on the management information.

2. Description of the Related Art

Moving-picture data recorded on conventional recording media such as DVDs, BDs, etc., contains audio-visual (AV) data that is compression-encoded and navigation data that is needed to control the reproduction of AV data.

Specifically, AV data includes an AV stream composed of video, audio, and/or subtitles, which are encoded according to a Moving Picture Experts Group (MPEG) standard. AV data may further include additional information, such as encoding properties of an AV stream or an entry point for random access, and a play list, which is an object to arrange the order of reproducing moving-pictures.

Navigation data includes navigation commands to control the reproduction of AV data. Examples of the navigation commands include a command to reproduce a play list and a command to jump to another play list. AV data may be reproduced with reference to navigation information recorded in a storage medium. Thus, a user may watch a high-quality moving-picture such as a movie.

Also, application data providing a programming function in addition to moving-picture data is provided to allow for an interactive operation with a user. The application data may be executed in a title or a plurality of titles included in an information storage medium.

However, when content is too large to be stored in one information storage medium, the content is stored in a plurality of information storage media. For examples, games are separately stored in a plurality of information storage media using a series of contents or a plurality of stages. Therefore, it is necessary to execute an application from the plurality of information storage media and manage the application.

SUMMARY OF THE INVENTION

The following description relates to an information storage medium storing management information of an application executable from a plurality of information storage media, and a method and apparatus to execute the application based on the management information.

According to one general aspect, there is provided a method of executing an application from a plurality of information storage media, the method comprising: if a new information storage medium is inserted into a reproducing apparatus during the execution of the application, reading information on an identifier of the new information storage medium; and determining whether to continuously execute the application based on the information and continuously executing the application according to a result obtained by the determination.

The reading of the information on the identifier of the new information storage medium may comprise: extracting information on the identifier of the new information storage medium.

The application may comprise information on an identifier of an information storage medium capable of executing the application, while the determining whether to continuously execute the application comprises: comparing the information on the identifier of the information storage medium included in the application with the information on the identifier of the new information storage medium, and determining whether to continuously execute the application based on a result of the comparison.

The determining whether to continuously execute the application may further comprise: if the information on the identifier of the information storage medium included in the application is identical to the information on the identifier of the new information storage medium, maintaining the reproduction of the application.

The determining whether to continuously execute the application may further comprise: if the information on the identifier of the information storage medium included in the application is not identical to the information on the identifier of the new information storage medium, providing a user interface requiring reconfirmation of a user.

The determining whether to continuously execute the application may further comprise: separately managing information on the identifier of the information storage medium capable of executing the application with reference to an application management table (AMT) stored in the information storage medium, when the new information storage medium is inserted into the reproducing apparatus, comparing the identifier of the new information storage medium with the AMT, and determining whether to reproduce the application.

According to another general aspect, there is provided a method of executing an application from a plurality of information storage media, the method comprising: if a new information storage medium is inserted into a reproducing apparatus during the execution of the application, confirming whether the new information storage medium includes the same information on an identifier of an application as the executed application; and determining whether to continuously execute the application based on a result obtained by the confirmation and continuously executing the application according to a result obtained by the determination.

The determining whether to continuously execute the application may comprise: if the new information storage medium includes the same information on an identifier of an application as the executed application, continuously executing the application.

The determining whether to continuously execute the application may further comprise: if the new information storage medium does not include the same information on an identifier of an application as the executed application, providing a user interface requiring a reconfirmation of a user.

The determining whether to continuously execute the application may further comprise: if the new information storage medium does not include the same information on an identifier of an application as the executed application, terminating the application.

The confirming of whether the new information storage medium includes the same information may comprise: confirming that the new information storage medium includes the same information on the identifier of the application as information on an identifier of the executed application based on an AMT stored in the new information storage medium.

According to another general aspect, there is provided an application management table (AMT) to manage an application executed from a plurality of information storage media, the AMT comprises: an ID identifying the application; and information indicating whether the application is a disc unbound application executed from the plurality of information storage media.

The AMT may further comprise: information on an identifier of an information storage medium capable of executing the application.

According to another general aspect, there is provided an information storage medium storing an AMT to manage an application executed from a plurality of information storage media, wherein the AMT comprises: an ID identifying the application; and information indicating whether the application is a disc unbound application executed from the plurality of information storage media.

The AMT may further comprise: information on an identifier of an information storage medium capable of executing the application.

According to another general aspect, there is provided a reproducing apparatus for an information storage medium storing an application executed from a plurality of information storage media, the reproducing apparatus comprises: an application manager to manage the execution of the application, and to terminate the application when an information storage medium is ejected from the reproducing apparatus and a new information storage medium is not inserted into the reproducing apparatus within a predetermined time during the execution of the application.

The application manager may forcibly terminate the application if a new information storage medium is not inserted into the reproducing apparatus within a predetermined time by measuring a system clock after an information storage medium is ejected from the reproducing apparatus.

The reproducing apparatus may further comprise: a module manager providing a user interface so that a user may terminate the application while the information storage medium is not inserted in the reproducing apparatus, and to receive a user input through the user interface.

The module manager may further provide a termination key to execute a command input through the user interface.

The module manager may map the command input through the user interface to an existing key.

The module manager may mask keys included in the user interface relating to the application when no information storage medium is inserted into the reproducing apparatus.

The application manager may control the application not to access a local storage of the reproducing apparatus or a network while no information storage medium is inserted in the reproducing apparatus.

Other features and aspects may be apparent from the detailed description which follows, the drawings, and the claims.

BRIEF DESCRIPTION OF THE DRAWINGS

Other features and aspects may become apparent from the following detailed description, taken in conjunction with the accompanying drawings of which:

FIG. 6B illustrates another structure of an AMT according to a general aspect;

FIG. 6C illustrates another structure of an AMT according to a general aspect;

FIG. 7 illustrates a relationship between a waiting time from the ejection of a storage medium to the insertion of a new storage medium and the execution of the BD-J application;

DETAILED DESCRIPTION

Figure 1:
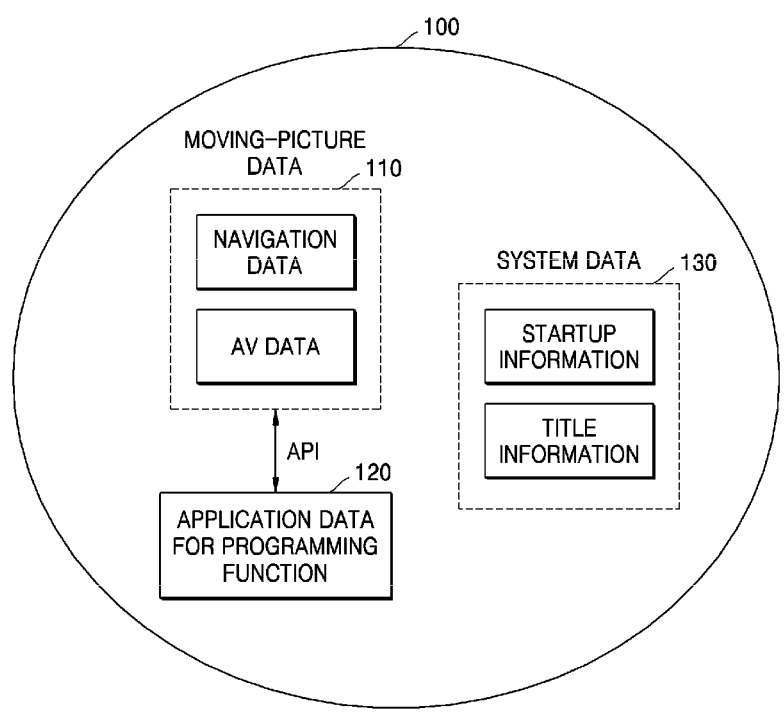
FIG. 1 illustrates types of data recorded on an information storage medium according to a general aspect.

Reference will now be made in detail to general aspects, examples of which are illustrated in the accompanying drawings, wherein like reference numerals refer to the like elements throughout. General aspects are described below with reference to the figures.

FIG. 1 illustrates types of data recorded on an information storage medium 100 according to a general aspect. Referring to FIG. 1, the information storage medium stores moving-pictures data 110, application data 120 for a programming operation (hereinafter referred to as application data), and system data 130.

The moving-pictures data 110 used in reproducing moving-pictures is referred to as core mode data or movie mode data. The moving-pictures data 110 includes AV data that is compression-encoded and navigation data to control the reproduction of AV data. Therefore, AV data may be reproduced with reference to the navigation data recorded on the storage medium, and a user may watch high-quality moving-pictures such as movies.

The application data 120 used to provide interactive operations with the user is referred to as full mode data. The application data 120 may provide a variety of applications offering games using moving-pictures, an operation to display a director's commentary while reproducing a portion of a moving-picture, an operation to display additional information while reproducing a portion of a moving-picture, or a chatting operation during a reproduction of a moving-picture.

If a movie has been recorded on the information storage medium, information related to the movie such as the latest news about actors/actresses starring in the movie, events related to the movie, or updated subtitles, which are stored on a web page or in a database, may be retrieved and reproduced together with the movie.

To execute an application program while reproducing a moving-picture, the application data 120 may include an application program interface (API) operation for a presentation engine that reproduces moving-picture information. The application data 120 is implemented using a program language such as C or JAVA. For example, a general aspect will describe a JAVA application such as xlet.

The system data 130 includes start-up information, title information, and application management information 131. Start-up information includes information on the position of data to be first reproduced by a reproducing apparatus. Title information includes information on entry and properties of data operated when each title is reproduced.

The information storage medium, according to a general aspect, includes the application data 120 for the programming operation in addition to the moving-pictures data 110 to reproduce a moving-picture and to provide a variety of interactive operations to the user.

Figure 2:
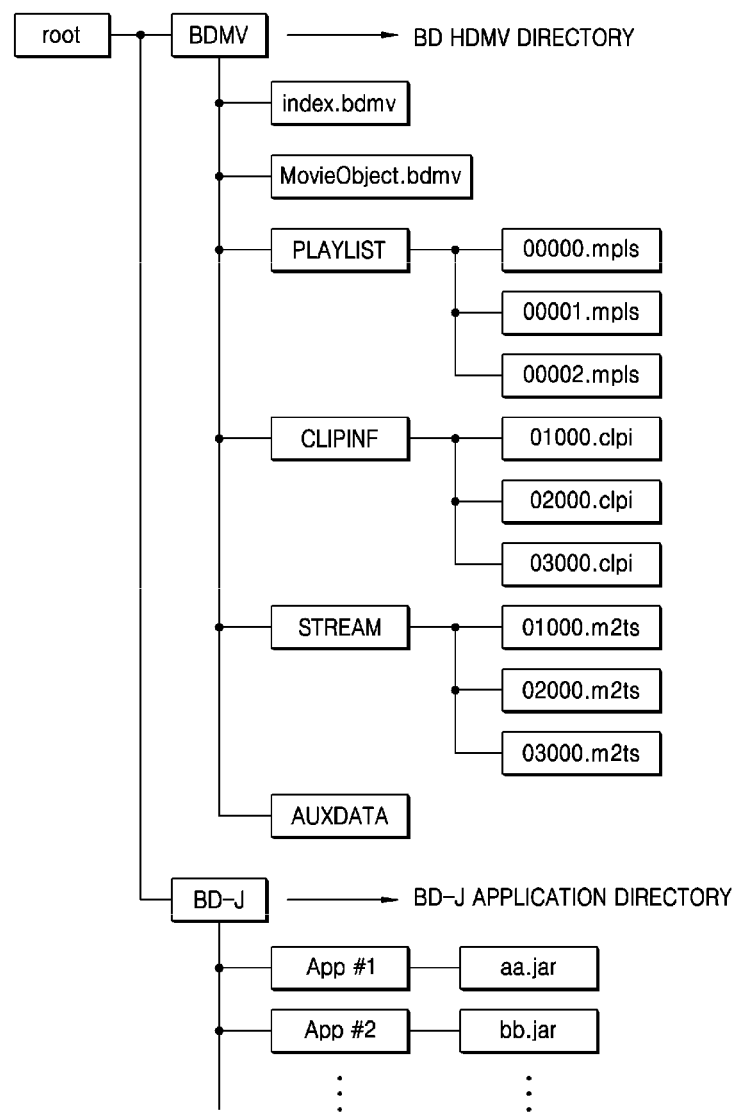
FIG. 2 illustrates a directory structure of the information storage medium of FIG. 1.

FIG. 2 illustrates a directory structure of the information storage medium recording the data illustrated in FIG. 1. Referring to FIG. 2, a BDMV directory under a root directory stores the high quality moving-pictures data 110 and the system data 130 and includes an index table directory, a movie object directory, a play list directory, a clip information directory, a clip AV stream directory, and an auxiliary data directory. Also, a BD-J application directory under the root directory stores the application data 120 for the programming operation and includes application identification (ID) directories and actual data directories of application programs.

More specifically, the system data 130, is stored under the filename "index.bdmv." A movie object including navigation data is stored under the filename "MovieObject.bdmv." Also, a play list that is a unit of reproduction of a moving-picture is stored under filenames having five numbers and an extension .mpls under the PLAYLIST directory. A clip AV stream is stored under a filename having five numbers and an extension .m2ts under the STREAM directory. In particular, a clip information file corresponding to the clip AV stream file has the same five numbers as the clip AV stream file and a different extension from the clip AV stream file. Auxiliary data such as a font file for a text subtitle is stored in the AUXDATA directory.

The application data 120 is stored with the filename "aa.jar" in the APP #1 directory indicating information on an identifier of an application. According to an embodiment of the invention, a plurality of applications may be stored with the filenames "aa.jar," "bb.jar," etc., in the APP #1 directory, and the APP #2, etc., indicating information on identifiers of the plurality of applications.

Figure 3:
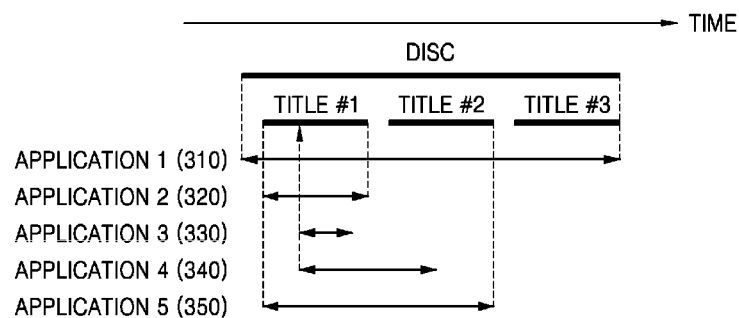
FIG. 3 illustrates life cycles of BD-J applications being executed during the reproduction of titles.

FIG. 3 illustrates life cycles of BD-J applications being executed during the reproduction of titles. Referring to FIG. 3, a variety of applications, which are operated in a BD-J mode are separated in titles to be used as a reproduction unit in an information storage medium, are executed and terminated during the reproduction of the titles.

Life cycles of applications are managed in titles using an application management table (AMT). An application that is not defined in the AMT cannot be executed during the reproduction of a title. Therefore, an application having a life cycle in a specific title defined in the AMT is automatically terminated when the title is converted into another title.

However, an application 1 (310), an application 4 (340), and an application 5 (350) are continuously executed when titles that are currently being reproduced are converted into other titles. The application 1 (310), the application 4 (340), and the application 5 (350) are title unbound applications. Since the title unbound applications are registered in the AMT along with a plurality of titles, even when a title is terminated, the title unbound applications are continuously executed.

Figure 4:
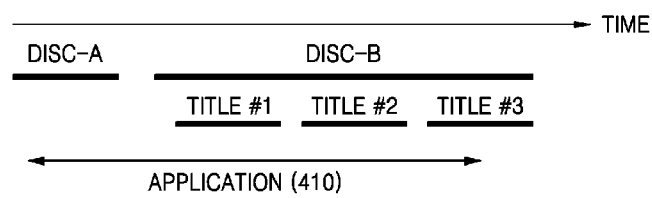
FIG. 4 illustrates a life cycle of a BD-J application being executed from a plurality of information storage media.

FIG. 4 illustrates a life cycle of a BD-J application being executed in a plurality of information storage media. According to FIG. 4, one piece of contents is recorded in a plurality of information storage media (e.g., discs) and, thereafter, an application is executed from the plurality of information storage media. The application is a disc unbound application. The disc unbound application is required to share one application from a plurality of information storage media which are correlated in view of contents.

For example, when one piece of moving-picture data is recorded in the plurality of discs, a game application is provided as an application of the moving-picture data. In this regard, when a disc 2 is necessarily reproduced while the game application is executed from a disc 1, processing the game application being executed is difficult.

The disc unbound application has the following problems, unlike the title unbound application, which does not have the problems. Referring to FIG. 4, an application 410 is the disc unbound application executed from a disc A and a disc B. In this regard, a cross-disc life cycle must be maintained to execute the application 410 from a plurality of authenticated information storage media. However, when the disc A is not replaced by the disc B but is replaced by a new information storage medium that is erroneously inserted into the reproducing apparatus by the user, the application 410 is terminated and another application defined by the new information storage medium is executed. That is, reproduction of the disc unbound application is not guaranteed. Therefore, unlike the title unbound application, the disc unbound application must double-check whether an unexpectedly inserted information storage medium has been inserted into the reproducing apparatus.

Figures 5, 6A:
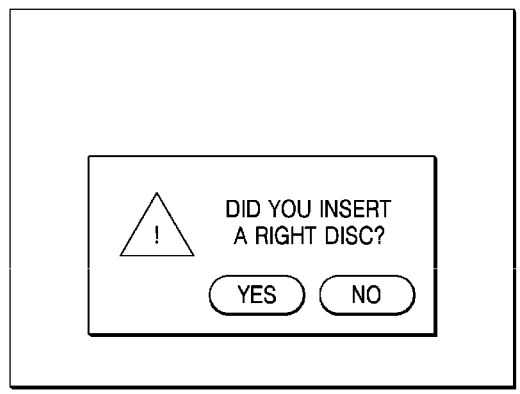
FIG. 5 illustrates a message provided to a user when a new information storage medium is inserted into a reproducing apparatus during the execution of the BD-J application illustrated in FIG. 4.
FIG. 6A illustrates a structure of an application management table (AMT) according to a general aspect.

FIG. 5 illustrates a message provided to a user when a new information storage medium is inserted into a reproducing apparatus during the execution of the BD-J application illustrated in FIG. 4. Referring to FIG. 5, to address a problem of an unexpectedly inserted information storage medium into the reproducing apparatus, when the new information storage medium is inserted into the reproducing apparatus during the execution of a disc unbound application, a message is provided to the user without terminating the disc unbound application. Therefore, when information storage media are exchanged during the execution of the disc unbound application, reproduction of the disc unbound application is guaranteed.

More specifically, a variety of methods of providing the message to the user will now be described. A first method includes providing information to process the disc unbound application. A second method includes providing information to process the disc unbound application in an AMT of a disc.

The first method uses information on an identifier of the information storage medium. That is, a manufacturer inserts a specific program to process the disc unbound application in advance. When the new information storage medium is inserted into the reproducing apparatus during the execution of the disc unbound application, the disc unbound application reads unique information on an identifier of the new information storage medium, e.g., a disc ID. Also, the disc unbound application compares the read information on the identifier with unique information on an identifier of an information storage medium in which an application registered in the disc unbound application may be executed, and provides a user interface based on the result obtained by the comparison.

In detail, if the information on the identifiers of the information storage media are identical to each other, the user interface illustrated in FIG. 5 is not provided to a user. Rather, the application is continuously reproduced. However, if the information on the identifiers of the information storage media are not identical to each other, the user interface illustrated in FIG. 5 is provided to the user so as to prompt the user to insert the information storage medium in the reproducing apparatus.

The second method makes use of information on the identifier of the information storage medium or information on an identifier of an application as the information for processing the application. In detail, when the new information storage medium is inserted into the reproducing apparatus during the execution of the disc unbound application, it is determined whether to execute the disc unbound application based on the AMT according to a general aspect, recorded in the information storage medium.

A variety of AMTs may be realized according to general aspects.

FIG. 6A illustrates a structure of an AMT according to a general aspect. Referring to FIG. 6A, the AMT relating to one title includes information on identifiers of applications, information on whether applications are disc unbound applications, and, if the applications are the disc unbound applications, disc unbound information including information on identifiers of information storage media in which the disc unbound applications are effectively executed.

FIG. 6B illustrates another structure of an AMT according to another general aspect. Referring to FIG. 6B, the AMT relating to one title includes information on types of applications, information on identifiers of applications, and titles effectively executing the application, or information on identifiers of discs. The information on types of applications refers to information on whether the applications are title dependent applications, title unbound applications, or disc unbound applications.

The embodiments illustrated in FIGS. 6A and 6B include unique information on identifiers of information storage media to effectively execute the disc unbound applications. Therefore, when the disc unbound applications are operated, a reproducing apparatus separately manages information on an identifier of an information storage medium effectively executing the application defined in the AMT. When a new information storage medium is inserted into the reproducing apparatus, the reproducing apparatus reads information on an identifier of a previously inserted information storage medium, and compares the read information with the information on the information storage medium on which the application may be effectively executed. If the information of the media are identical to each other, the reproducing apparatus does not provide a user interface to a user but continuously reproduces the disc unbound application. If the information of the media are not identical to each other, the reproducing apparatus provides the user interface illustrated in FIG. 5 to the user.

Unlike the AMTs illustrated in FIGS. 6A and 6B, the information on the information storage medium effectively executing the disc unbound application is not included in an AMT.

FIG. 6C illustrates another structure of an AMT according to a general aspect. Referring to FIG. 6C, the AMT relating to one title includes information on identifiers of applications, and information on whether applications are disc unbound applications. The AMT does not include information on an information storage medium on which a disc unbound application may be effectively executed.

When a new information storage medium is inserted into a reproducing apparatus during the execution of the disc unbound application, the reproducing apparatus reads information on the AMT recorded in the new information storage medium. The reproducing apparatus confirms whether the AMT includes information on an identifier of the same application as the disc unbound application. If the AMT includes information on the identifier of the same application as the disc unbound application, the reproducing apparatus continuously executes the application. If the AMT does not include information on the identifier of the same application as the disc unbound application, the reproducing apparatus provides the user interface illustrated in FIG. 5 to a user or terminates the disc unbound application.

FIG. 7 illustrates a relationship between a required waiting time 610 from the ejection of a storage medium to the insertion of a new storage medium and the execution of the BD-J application. Referring to FIG. 7, a disc unbound application requires a predetermined time, such as the waiting time 610, to insert different information storage media into a reproducing apparatus. During the waiting time 610, no information storage medium is inserted into the reproducing apparatus but a specific disc unbound application is executed. When, during the waiting time 610, the executable disc unbound application accesses a local storage of the reproducing apparatus or a web site of a manufacturing company over a network, access security may not be secure. When the waiting time 610 is allowed to continue indefinitely, the application is continuously executed without requiring that an information storage medium be purchased by the user. Therefore, the reproducing apparatus according to general aspects may have the following operations.

First, if the waiting time 610 required to execute a specific application, without an information storage medium, exceeds a predetermined time, the disc unbound application may be terminated. To this end, an application manufacturer may program an automatic termination of the specific application if the waiting time 610 exceeds the predetermined time. Also, if a disc B is not inserted into the reproducing apparatus within a predetermined time by measuring a system clock after a disc A is ejected from the reproducing apparatus, the application manufacturer may program a forced termination of the specific application.

Second, a user input key used to forcibly terminate the disc unbound application and a user operation for the user input key are provided to a user input device of the reproducing apparatus. The user ejects the disc A and continuously executes the disc unbound application regardless of inserting a new information storage medium into the reproducing apparatus. Also, when the user ejects the disc A and wishes to execute an application from an information storage medium not related to the disc unbound application, if the reproducing apparatus displays the user interface illustrated in FIG. 5, the user may not properly execute the new application.

Therefore, the user may terminate the application using the user input key to forcibly terminate the disc unbound application. In addition, according to an embodiment of the invention, instead of the user input key, the user input device may provide the user operation to terminate the application using an existing key. For example, the user may terminate the disc unbound application by pressing a stop key twice.

Third, the reproducing apparatus may prevent an executable disc unbound application, during the waiting time 610 when no information storage medium is inserted into the reproducing apparatus, from accessing the local storage of the reproducing apparatus and website of a specific manufacturer. If such regulation is not provided, access to the local storage of the reproducing apparatus and website of the specific manufacturer may be possible. Here, where an information storage medium comprises a bad disc unbound application, access security may not be secured. Therefore, when the disc unbound application requires materials of the local storage and the website, the reproducing apparatus confirms whether an information storage medium is inserted into the reproducing apparatus, and, if the information storage medium is not inserted into the reproducing apparatus, the request of the disc unbound application may be disregarded.

Fourth, the reproducing apparatus may mask keys included in the user interface and which are related to the executable disc unbound application during the waiting time 610 when no information storage medium is inserted into the reproducing apparatus, such that the user cannot operate the keys. This prevents a disc unbound application from accessing the local storage of the reproducing apparatus and website of the specific manufacturer using a bad information storage medium, or, when discs are exchanged during the execution of a game application including moving-picture data, prevents the game application from being terminated by an erroneous pressing of keys provided in the user interface.

Figure 8:
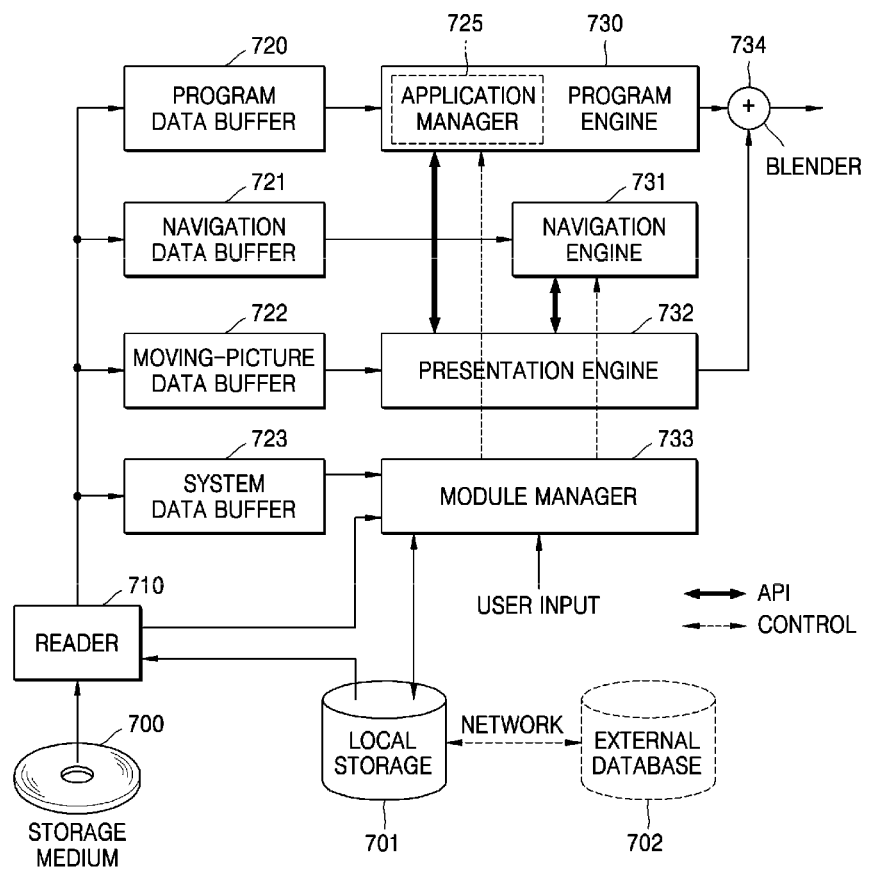
FIG. 8 is a block diagram of a reproducing apparatus according to a general aspect.

FIG. 8 is a block diagram of a reproducing apparatus according to a general aspect. Referring to FIG. 8, the reproducing apparatus includes a reader 710 to read data from an information storage medium 700, buffers 720 through 723 to temporarily store the read data, and reproducers 725 through 734, which are engines to reproduce the buffered data.

The reproducers comprise a module manager 733 that controls a navigation engine 731 by reading system data and processing a title change made by an initial execution and a user selection or a navigation change, etc., a navigation engine 731 that controls the reproduction of moving-picture based on the content of navigation data, a presentation engine 732 that decodes moving-picture data and outputs the decoded moving-picture, and a program engine 730 that executes an application program. For example, a JAVA virtual machine executing a JAVA application and a browser engine executing a HTML application are required to reproduce both the JAVA and HTML applications.

The reproducers further include a blender 734 that overlays a result obtained by executing the application program of the program engine 730 and a result obtained by reproducing the moving-picture data of the presentation engine 732. The blender 734 then forms a screen. Further, the program engine 730 may include an application manager 725 that controls the execution of the application program using an application object so as to provide a program operation.

The application manager 725 manages the execution of the application, and terminates the application when an information storage medium is ejected from the reproducing apparatus and a new information storage medium is not inserted into the reproducing apparatus within a predetermined time during the execution of the application. The application manager 725 controls the application not to access a local storage of the reproducing apparatus or a network while the new information storage medium is not inserted in the reproducing apparatus. The detailed description is provided with reference to FIGS. 4 through 7.

The reproducing apparatus further comprises a local storage 701 that stores a program application downloaded from an information storage medium 700 or an external database 702. Therefore, the module manager 733 forms a virtual file system illustrated in FIG. 2 using data read from the information storage medium 700 and the local storage 701 and transfers reproduction control information to the program engine 730 and the navigation engine 731.

The module manager 733 provides a user interface so that a user may terminate the application while the information storage medium 700 is not inserted in the reproducing apparatus. For example, the user interface may provide a termination key used to execute a command performing a user input, and to map the command to an existing key.

Figure 9:
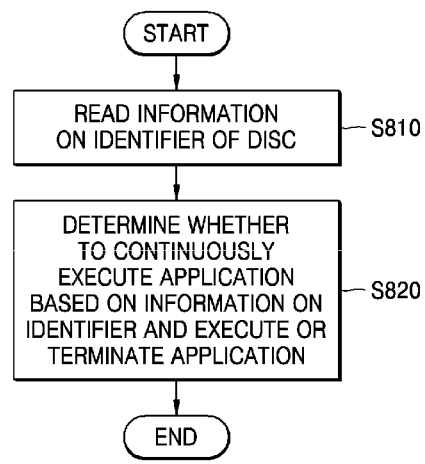
FIG. 9 is a flowchart illustrating a method of executing an application according to a general aspect.

FIG. 9 is a flowchart illustrating a method of executing an application according to a general aspect. Referring to FIG. 9, a disc unbound application is reproduced, if a disc is ejected and a new disc is inserted, and information on an identifier of the new disc is read (operation 810). Based on the information, whether to continuously execute the disc unbound application is determined (operation 820). A method of determining whether to continuously execute the disc unbound application has been described with reference to FIGS. 4 through 7.

According to a general aspect, a life cycle of a disc unbound application is managed so as to use an application that can be stored on different information storage media.

A general aspect may also be embodied as computer readable code on a computer readable recording medium. The computer readable recording medium is any data storage device that stores data which may be thereafter read by a computer system. Examples of the computer readable recording medium include read-only memory (ROM), random-access memory (RAM), CD-ROMs, magnetic tapes, floppy disks, optical data storage devices, and carrier waves.

Although a number of examples have been shown and described, it would be appreciated that changes may be made without departing from the scope of the claims.

What is claimed is:

1. An apparatus to execute an application over a plurality of information storage media to provide one or more interactive operations with a user, the apparatus comprising:
   a reproducer configured to:
      execute the application from a first information storage medium, each storage medium of the plurality of information storage media comprising an application management table (AMT),
      wherein the AMT corresponds to a title stored in the each storage medium; and the AMT comprises an application identifier indicating executable application during the reproduction of the title, and lifecycle information as to whether the executable application is terminated when the storage medium is ejected;
      confirm a lifecycle of the application from an AMT associated with the reproduced title in the first information storage medium when the first information storage medium is ejected;
      continuously execute the application when the lifecycle indicates that the application is a disc unbound application;
      read an AMT stored in a second information storage medium when the second information storage medium is inserted into the apparatus during continuous execution of the application;
      determine whether to continue executing the application based on the AMT associated with a reproduced title in the second information storage medium, stored in the second information storage medium; and
      continue or not continue executing the application according to a result of the determining of whether to continue executing the application.

2. The apparatus of claim 1, wherein the AMT further comprises information indicating whether the application is a disc unbound application.

3. The apparatus of claim 2, wherein the one or more interactive operations with the user provided by the application include games that use the application, an operation to display a director's commentary while reproducing a portion of application, an operation to display additional information while reproducing a portion of the application, a chatting operation during the reproduction of the application, or any combination thereof.

4. The apparatus of claim 1, wherein the AMT further comprises information indicating whether the application is a title unbound application.

5. The apparatus of claim 1, wherein the reproducer is configured to determine whether to continue executing the application by confirming that the application identifier stored in the AMT of the second information storage medium is the same as the application identifier stored in the AMT of the first information storage medium.

6. The apparatus of claim 2, wherein the AMT further comprises information indicating a disc ID when the application is a disc unbound application.

7. The apparatus of claim 1, wherein the AMT further comprises information indicating whether the application is a disc unbound application and whether the application is a title unbound application; the AMT further comprises information indicating a disc ID when the application is a disc unbound application; and the AMT further comprises information indicating a title when the application is a title unbound application.

* * * * *